(12) United States Patent
Kidambi et al.

(10) Patent No.: US 7,269,187 B2
(45) Date of Patent: Sep. 11, 2007

(54) PACKET DETECTION SYSTEM AND METHOD

(75) Inventors: Sunder S. Kidambi, Chelmsford, MA (US); Paul S. Wilkins, Weston, MA (US)

(73) Assignee: Analog Devices, Inc., Norwood, MA (US)

( * ) Notice: Subject to any disclaimer, the term of this patent is extended or adjusted under 35 U.S.C. 154(b) by 482 days.

(21) Appl. No.: 10/911,854

(22) Filed: Aug. 5, 2004

(65) Prior Publication Data

US 2006/0031740 A1 Feb. 9, 2006

(51) Int. Cl.
*H04J 13/00* (2006.01)

(52) U.S. Cl. ............... 370/479; 370/208; 370/234; 370/395.62; 370/546; 370/912

(58) Field of Classification Search .......... 370/208, 370/324, 395.62, 546, 912, 479
See application file for complete search history.

(56) References Cited

U.S. PATENT DOCUMENTS

| 7,151,759 | B1 * | 12/2006 | Ryan et al. ............. 370/332 |
| 2005/0254559 | A1 * | 11/2005 | Hou et al. .............. 375/150 |
| 2005/0255815 | A1 * | 11/2005 | Hammerschmidt et al. . 455/132 |

\* cited by examiner

*Primary Examiner*—R. Stephen Dildine
(74) *Attorney, Agent, or Firm*—Iandiorio & Teska (57) ABSTRACT

A packet detection technique is disclosed in which an average correlation signal is generated representative of the match between a repetitive sequence of symbols; an average power signal is generated representative of the average power in the sequence of symbols; a scaled magnitude of the average correlation signal scaled by a first predetermined scale factor is produced; and one of the average power signal and scaled magnitude of the average correlation signal are multiplied by the second scale factor and compared to determine whether there is a match between a repetitive sequence of symbols.

10 Claims, 6 Drawing Sheets

PACKET DETECTION SYSTEM AND METHOD

FIELD OF THE INVENTION

This invention relates to an improved packet detection method and system and more particularly which uses trivial mathematical operations to implement detection of packets such as the IEEE 802.11a standard.

BACKGROUND OF THE INVENTION

Orthogonal Frequency Division Multiplexing (OFDM) is a widely used technique for achieving high data rate and combating multipath fading in wireless communications. In OFDM, all the orthogonal carriers are transmitted simultaneously wherein the entire allocated bandwidth is occupied through the aggregated sum of the narrow orthogonal subcarriers. By transmitting several symbols at the same time, the effective symbol duration is increased commensurately. As a consequence, the effects of ISI caused by dispersive Rayleigh fading environment is reduced.

Currently, there are three approved standards of Wireless Local Access Networks (WLAN) that utilize OFDM for their physical layer specifications. They are the High Performance Local Area Network (Type 2) (HiperLAN/2), Mobile Multimedia Access Communications (MMAC) and the IEEE 802.11a. Each standard offers data rates ranging from 6 Mbps to 54 Mbps. The packet preamble specified by the IEEE 802.11a standard consists of ten identical short and two identical long OFDM training symbols where $t_1$ to $t_{10}$ denote the short training symbols (each containing 16 samples) and $T_1$ and $T_2$ denote the long training symbols (each containing 64 samples). The short and long preamble symbols are followed by a signal field which in turn is followed by the data field. The structure of the WLAN preamble enables the receiver to use a very simple and efficient algorithm to detect it. Since the time-domain short and long training sequences are periodic, a delay and correlate type of algorithm can be used. The 802.11a standard uses a sixteen sample delay line and a conjugator so that the incoming samples in each short training symbol, $t_1$-$t_{10}$, is correlated with the samples in the same position in the previous short training symbol. The conjugate of the delayed samples and the present incoming samples are multiplied together and a moving average is determined. The moving average output, which will be a real number if there is a perfect match and will be a complex number including an imaginary term, if, as more normally, there is a mismatch, is submitted to a magnitude squarer and delivered to a divider. The delayed samples are also submitted to a magnitude squarer after which a moving average is determined and is squared before also being submitted to the divider to normalize the output of the divider so that the matching will be independent of the input signal intensity. The output of the divider is then submitted to a threshold unit such as a comparator. If it exceeds a predefined threshold, a match is indicated. While the approach works well, it has some shortcomings: the square of the absolute value of a complex number and the square of a real number have to be calculated. One operation would require two multiplications and one addition, the other, one multiplication in addition to the divider operation. This results in complex circuits which require significant power.

BRIEF SUMMARY OF THE INVENTION

It is therefore an object of this invention to provide an improved packet detection system and method.

It is a further object of this invention to provide such an improved packet detection system and method which is less complex and requires less power.

It is a further object of this invention to provide such an improved packet detection system and method which supports the IEEE 802.11a standard.

It is a further object of this invention to provide such an improved packet detection system and method which employs only simple trivial mathematical operations.

It is a further object of this invention to provide such an improved packet detection system and method which employs a simple CORDIC, (COordinate Rotation for DIgital Computers) shift and add circuits and a comparator or subtractor.

The invention results from the realization that a simpler and lower-power packet detection method and system which eliminates a division and a number of multiply and add operations can be achieved using a CORDIC to obtain from the average correlation signal a scaled magnitude of that signal and combining it in a scaled comparator system which multiplies one of the average power signal and the scaled magnitude of the average correlator signal by a second scale factor and comparing the resulting signals to determine whether there is a match between a repetitive sequence of symbols.

This invention features a packet detection system including a correlator circuit for generating an average correlation signal representative of the match between repetitive sequence of symbols and a power estimator circuit for generating an average power signal representative of the average power in the sequence of symbols. A modified CORDIC circuit responds to the average correlation signal to produce the scaled magnitude of the average correlation signal scaled by a first predetermined scale factor. A scaling comparator system multiplies one of the average power signal and the scaled magnitude of the average correlation signal by a second scale factor and compares the signals to determine whether there is a match between a repetitive sequence of symbols.

In a preferred embodiment, the scaling comparator system may include a multiplier circuit for multiplying the average power signal by the second scale factor to obtain a scaled function of the average power. There may be a comparator circuit responsive to the scaled function of the average power and the scaled magnitude of the average correlation signal to determine whether there is a match between a repetitive sequence of symbols. The average power circuit may drive a multiplier circuit for multiplying the average power signal by the second scale factor to obtain the scaled function of the average power. The multiplier circuit may include a shift and add circuit. The correlator circuit may include a delay circuit responsive to the sequence of symbols, a conjugating circuit responsive to the delayed sequence of symbols, a multiplier circuit responsive to the sequence of symbols and the delayed conjugated sequence of symbols from the conjugating circuit to produce an instantaneous value of the correlation and a moving average circuit responsive to the instantaneous value of the correlation to produce the average correlation signal. The power estimator circuit may include a magnitude squarer circuit for providing a signal representative of the instantaneous power in a sequence of symbols and a moving average circuit responsive to the signal representative of the instantaneous power to produce the average power signal.

The invention also features packet detection method including generating an average correlation signal representative of the match between the repetitive sequence of symbols and generating an average power signal representative of the average power in the sequence of symbols. A scaled magnitude of the average correlation signal scaled by a first predetermined scale factor is produced. One of the average power signal and scaled magnitude of the average correlation signal are multiplied by a second scale factor and compared to determine whether there is a match between a repetitive sequence of symbols.

In a preferred embodiment, the scaled average correlation signal may be multiplied by the second scale factor to obtain a second scaled function of the average correlation and the scaled function of the average correlation and the average power signal may be compared to determine whether there is a match between a repetitive sequence of symbols. The scaled average correlation signal may be multiplied by a second scale factor to obtain the scaled function of the average correlation. The multiplication may include shifting and adding.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
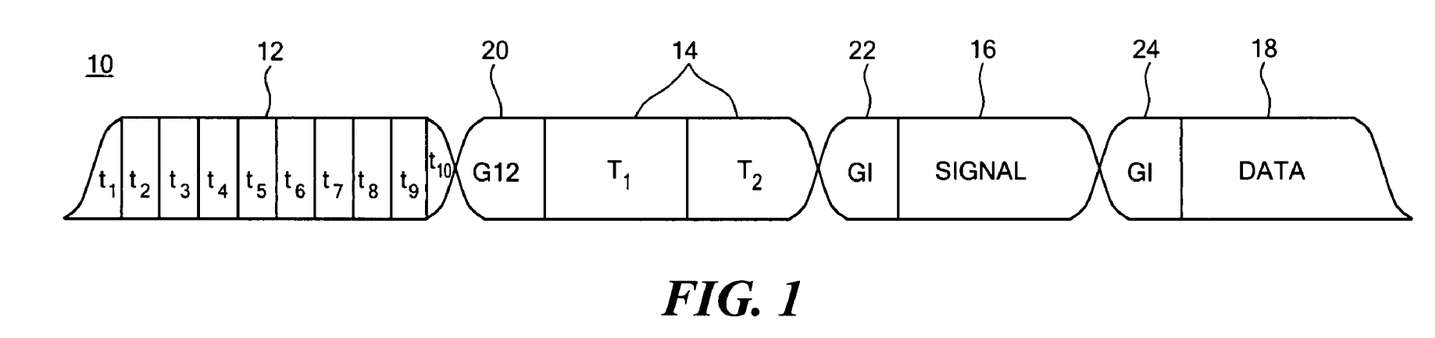
FIG. 1 is illustration of the OFDM (Orthogonal Frequency Division Multiplexing) preamble structure adopted by the IEEE 802.11a standard.

The packet preamble 10, FIG. 1, specified by the IEEE 802.11a standard consists of ten identical short $t_1$-$t_{10}$, 12 and two identical long $T_1$, $T_2$ 14 OFDM (Orthogonal Frequency Division Multiplexing) training symbols. Each of the short symbols 12, $t_1$-$t_{10}$, contains sixteen samples and each of the long training symbols 14 $T_1$, $T_2$ contain 64 training samples. The short 12 and long 14 preamble symbols are followed by a signal field 16 and data field 18. There are additional portions GI2 20, GI 22 and GI 24 which are well known portions of the IEEE standard used in combating perturbations caused by the medium through which the signals travel.

The structure of this preamble enables the receiver to use a very simple and efficient algorithm to detect it. Since the time domain short and long training sequences are periodic, a delay and correlate type of algorithm is used. A typical conventional structure for detecting these packets is prior art packet detection system 30, FIG. 2. Packet detection system 30 includes a correlator circuit 32 and power estimator circuit 34 as well as magnitude squarer 36, divider 38, squarer 40 and comparator 42. Correlator circuit 32 includes a sixteen-sample delay line 44 corresponding to the sixteen samples contained in each of the short training symbols 12 $t_1$-$t_{10}$. Correlator circuit 32 includes multiplier 46 and a conjugating circuit 48 as well as moving average circuit 50. Power estimator circuit 34 includes a magnitude squarer 52 and moving average circuit 54. Each sample presented at input $r_n$ is provided to multiplier 46 and also to sixteen-sample delay line 44. The output of delay line 44 is conjugated by conjugating circuit 48 and then multiplied with the input in multiplier 46. In this way, under an ideal situation, each input sample is multiplied by the same sample 12 in the corresponding position of the previous symbol 12 $t_1$-$t_{10}$.

Figure 2:
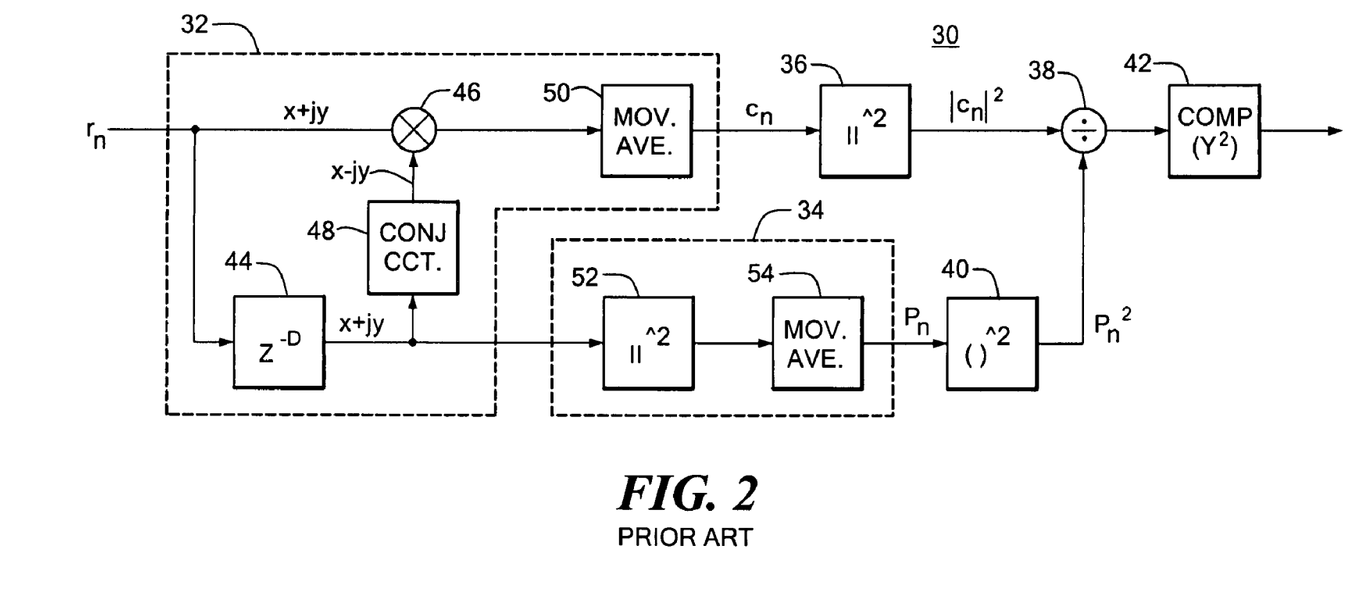
FIG. 2 is a prior art packet detection system for the IEEE 802.11a standard.

Assuming an input $r_n$ of $x_n+jy_n$, where $x_n$ and $j_n$ are real numbers, and a similar input from delay line 44, the output of conjugating circuit 48 will be a conjugate of $x_n+jy_n$ or $x_n-jy_n$. A moving average of the multiplication of these numbers is produced by the moving average circuit 50 whose output $c_n$ is a complex number. If there is a perfect match the complex number will have a real but no imaginary portion: if it is not a perfect match, which is more generally the case, then it will have a real and an imaginary portion. The complex number $c_n$ is presented to magnitude squarer 36 which produces an output that is always a real number and delivers it to divider 38. The output of delay 44 is also delivered to a magnitude squarer 52 in power estimator circuit 34. From the output of magnitude squarer 52, moving average circuit 54 provides a moving average value $p_n$ which represents the estimated power in the repetitive sequence of symbols. This output is squared by squarer circuit 40 and delivered to divider circuit 38. The output of the divider is compared with a pre-defined threshold value $Y^2$ in the comparator circuit 42: if it is a non-negative number, the indication is that there has been a match between the repetitive sequences of symbols.

As can be see from FIG. 2, the threshold is such that when $$\frac{|c_n|^2}{p_n^2} \geq Y^2 \quad (1)$$

is satisfied, it means that packets in the short preamble have been detected. Another way to effect equation (1) would be $$(|c_n|^2 - Y^2 p_n^2) \geq 0 \quad (2)$$

At each sample instant, the square of the absolute value of a complex number $c_n$, i.e., $|c_n|^2$, and the product of $Y^2$ and $p_n^2$ have to be calculated. Let us represent $c_n$ as $c_n=a_n+jb_n$ where, $a_n$ and $b_n$ are real numbers, $j=\sqrt{-1}$ and $|c_n|^2=a_n^2+b_n^2$. Calculation of $|c_n|^2$ would thus entail two multiplications and an addition, and, consequently, to effect Equation (2) three multiplications and two addition/subtraction operations are required in addition to the comparator 64 operation.

This invention involves a technique wherein packet detection in OFDM based receivers can be accomplished by mathematical operations that involve multiplications/divisions of numbers by numbers that can be represented as sums of powers of two. As is known, multiplication/division of numbers by numbers that can be represented as a sum of powers of two is a trivial operation. Rewriting Equation (2), we have $$(|c_n|+Yp_n)(|c_n|-YP_n) \geq 0 \qquad (3)$$

Since $(|c_n|+Yp_n)$ is always positive as both Y and $p_n$ are real and positive, one needs to verify that:

$$(|c_n|-Yp_n) \geq 0 \qquad (4)$$

The above equation can be rewritten as $$(K\sqrt{a_n^2+b_n^2}-K_1 p_n) \geq 0 \qquad (5)$$

where K is a constant and $K_1=KY$.

A CORDIC engine in the inverse circular mode of operation produces $K\sqrt{a_n^2+b_n^2}$, if $a_n$, $b_n$, and 0 are inputs to it, with simple shift and add operations on $a_n$ and $b_n$. Here K is a constant based on the number of iterations used in the CORDIC and is know apriori. A CORDIC (COordinate Rotation for DIgital Computers) is a mathematical engine that is used to calculate elementary and trigonometric mathematical functions using only additions and binary shift operations and is well known in the art. If $K_1$ can be approximated as $$K_1 \approx \sum_{k=0}^{Q-1} x_k 2^{y_k} \qquad (6)$$

where Q is the number of terms in the representation of $K_1$, $x_k \in [-1, 0, 1]$, and $y_k$ is any integer, then Equation (5) becomes $$K\sqrt{a_n^2+b_n^2} - \sum_{k=0}^{Q-1} x_k 2^{y_k} p_n \geq 0 \qquad (7)$$

The term $$\sum_{k=0}^{Q-1} x_k 2^{y_k} p_n$$

in the above equation indicates that $p_n$, at every sample instant, is multiplied by different powers of 2 and added/subtracted. Multiplication by a power of 2 is trivial since it entails only a shift operation.

Figure 3:
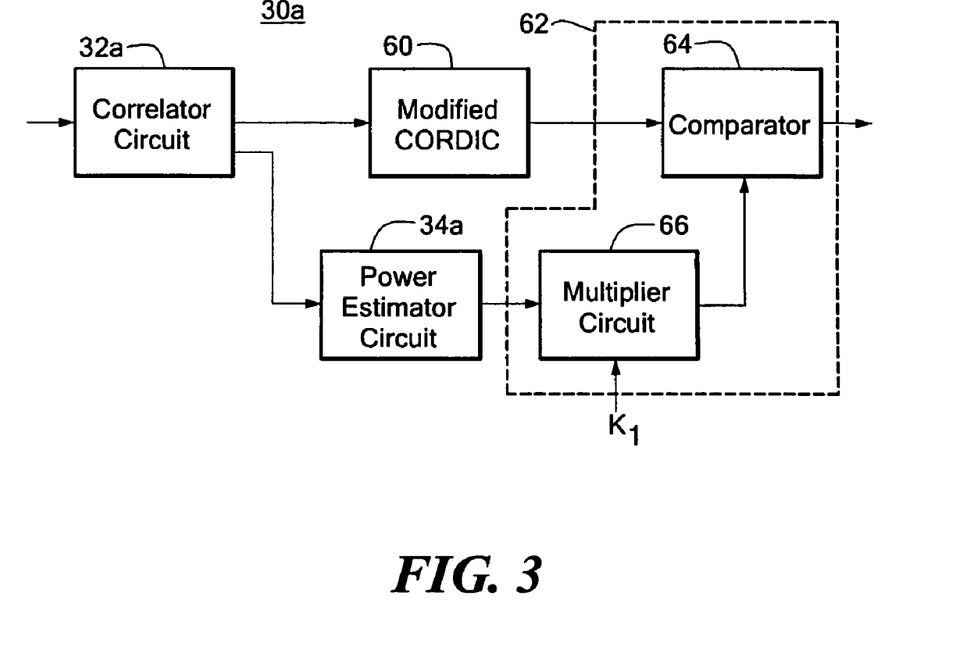
FIG. 3 is a schematic block diagram of a packet detection system according to this invention.

This foregoing realization can be foreclosed on by a packet detection system 30a, FIG. 3, according to this invention, where correlator circuit 32a and power estimator circuit 34a have been combined with a modified CORDIC 60 and a scaling comparator system 62 which includes a comparator 64 and a multiplier circuit 66. Correlator circuit 32a generates an average correlation signal representative of the match between repetitive sequences of symbols. Power estimator circuit 34a generates an average power signal representative of the average power in the sequence of symbols. The modified CORDIC circuit 60 responds to the average correlation signal for producing the scaled magnitude of the average correlation signal scaled by a first predetermined scale factor, e.g. K. The multiplier circuit multiplies one of the average power signals and the scaled magnitude of the average correlation signal by a second scale factor, e.g. $1/K_1$ for average correlation signal, K for average power signal. Comparator 64 compares the signals after application of the second scale factor to one of them to determine whether there is a match between a repetitive sequence of symbols.

Figure 4:
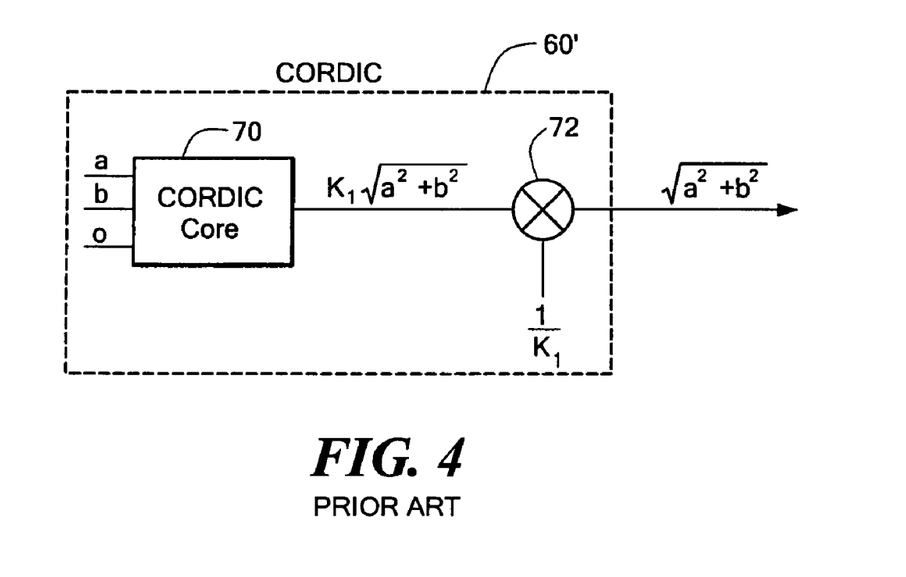
FIGS. 4 and 5 are schematic block diagrams of a CORDIC and modified CORDIC used in this invention.
Figure 5:
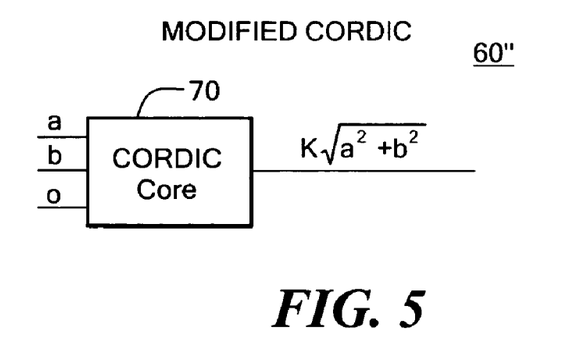

A conventional CORDIC 60', FIG. 4, includes a CORDIC core 70 and a multiplier 72. In order to obtain the normally desired output $\sqrt{a^2+b^2}$ from the inputs a, b, and 0, multiplier 72 is needed because CORDIC core 70 produces from those inputs a, b, 0, the output $K\sqrt{a^2+b^2}$. To remove the K, the multiplier circuit 72 is used to introduce the multiplier 1/K resulting in the desired output $\sqrt{a^2+b^2}$ from the inputs a, b and 0. However, with the realization in this invention that accommodating the factor K makes for a more efficient design as shown with respect to equation (5) above, the multiplication circuit 72 is eliminated so that the output of modified CORDIC 60", FIG. 5, is the output $K\sqrt{a^2+b^2}$ which satisfies the requirements of equation (5) above.

Figure 6:
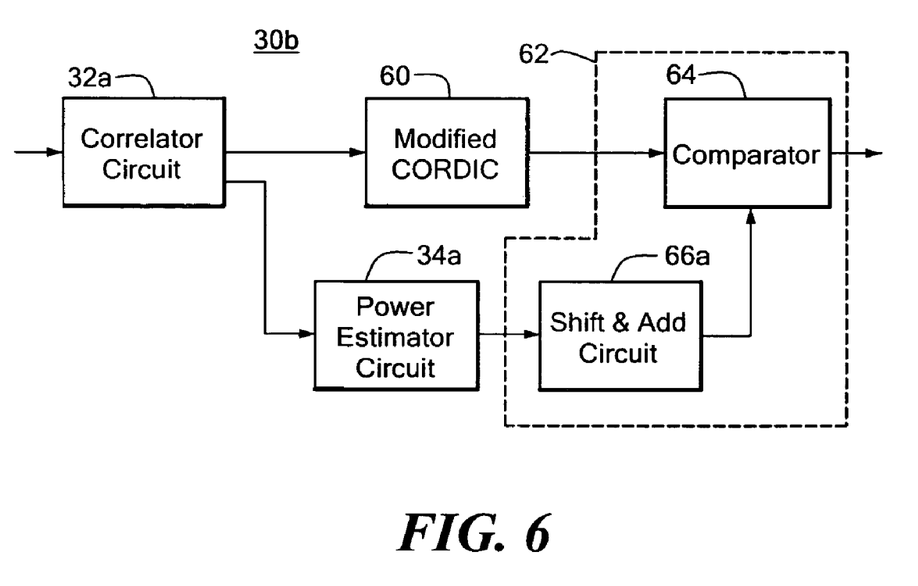
FIG. 6 is a view similar to FIG. 3 of another embodiment of the invention using a shift and add multiplier.
Figure 7:
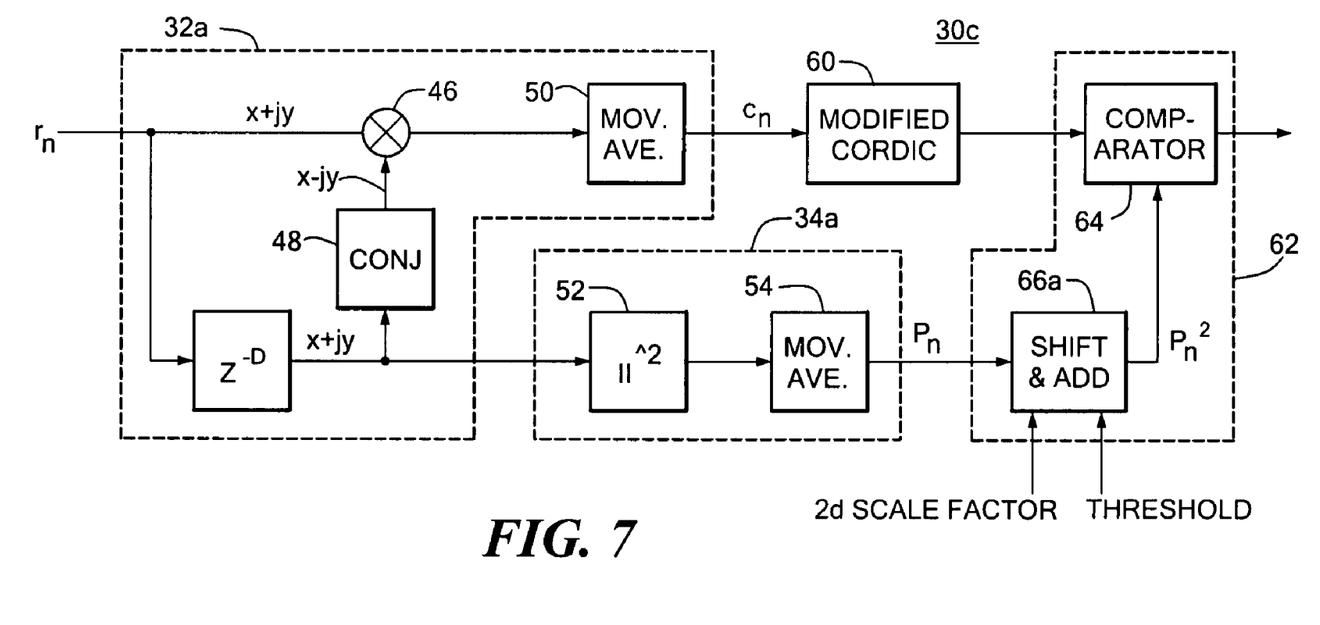
FIG. 7 is a more detailed block diagram of the packet detection system of FIG. 6.

The packet detection system 30a, FIG. 3, may be even more efficiently constructed if multiplier 66 is implemented with a shift and add circuit 66a, FIG. 6, which inherently multiplies by approximately $K_1$ the output of the power estimator 34a. This circuit is shown in even greater detail in FIG. 7. The average correlation signal is passed through the modified CORDIC 60 which produces the scaled magnitude of the average correlation signal $c_n$. The scaling factor K is dependent on the number of iterations used in the CORDIC algorithm. However, it must be stated that the value of K is known a priori. The reason for allowing the scaling is to eliminate the need for an extra multiplication operation that produces the correct magnitude of the average correlation signal. The signal $p_n$ passes through a series of shift and add/subtract operations 66a to produce the scaled value of $p_n$, the average power estimate of the signal. This scale factor is equal to K times Y, the square root of the threshold value. Since the threshold value is known a priori and since the K value is known a priori, the product K times Y is also known a priori. If the value K times Y can be approximated by a sum/difference of powers of two, the structure of the shift and add circuit also becomes known a priori. The comparator 64 subtracts the value of the average power signal that has passed through the shift and add circuit 66a from the average correlation signal that has passed through the modified CORDIC 60. A non-negative number from comparator 64 indicates that a match has been detected.

Figure 8:
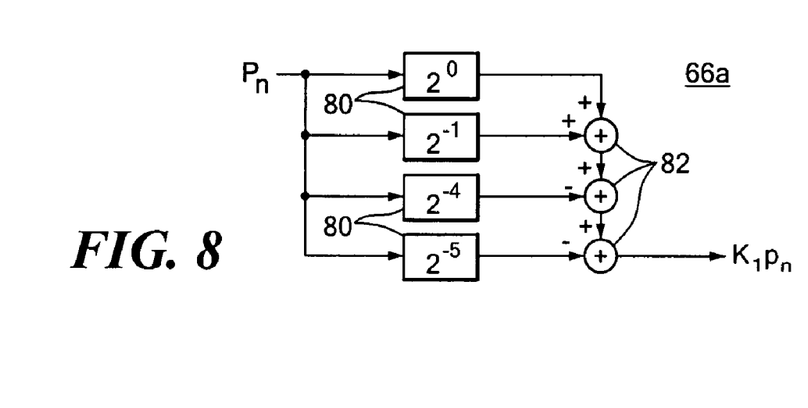
FIG. 8 is a more detailed schematic block diagram of the shift and add circuit of FIGS. 4 and 5.

The advantage and simplicity of a shift and add circuit implementation is explained with respect to a more detailed illustration of shift and add circuit 66a in FIG. 8, where input $p_n$ is submitted to a series of shift 80 and add circuits 82 to produce the output $K_1 p_n$ that is the scaled power estimate. For example, if the value of Y is equal to 0.86, then $Y_2$ equals 0.73; assuming a value of K, which is dictated and known by the number of iterations used in the CORDIC, of approximately 1.6468, then $K_1$, which is equal to KY, is approximately equal to 1.40625. That number can be represented by the combination of $2^0+2^{-1}-2^{-4}-2^{-5}$. This is implemented by shift and add circuit 66a, FIG. 8, with shifters 80 and summers 82 that results in the scaled output required. In order to determine if there is a match between repetitive sequence of symbols, the average correlation signal $c_n$ is presented to the modified CORDIC block which produces a scaled magnitude of it. This scaling factor is equal to K which, for example, is approximately equal to 1.646759996375618 for 10 iterations and 1.64657602581210816 for 20 iterations in a CORDIC algorithm. The average power signal $p_n$ is passed through the shift and add circuit 66a, FIG. 8, wherein the signal $p_n$ enters each of the shifters 80, viz., shift left by a 0, shift left by a 1, shift left 4 and shift left 5 circuits and the output from each of the shifters is appropriately added/subtracted. This output constitutes the scaled average power. The scaled average power is then subtracted from the scaled average correlation in the comparator circuit. A match is indicated when the subtraction results in a number that is non-negative, i.e. a number that is zero or greater than zero.

The invention also realizes that the multiplication can be effected by the CORIDIC itself. In that case, equation (5) can be re-written $$\left( \frac{K\sqrt{a_n^2 + b_n^2}}{K_1} - p_n \right) \geq 0 \tag{8}$$

by simply dividing all terms by $K_1$. Then if $1/K_1$ can be approximated as $$\frac{1}{K_1} \approx \sum_{k=d}^{Q-1} x_k 2^{y_k} \tag{9}$$

equation (5) becomes $$\left( K\sqrt{a_n^2 + b_n^2} \right)\left( \sum_{k=d}^{Q-1} x_k 2^{y_k} \right) - p_n \geq 0 \tag{10}$$

Figure 9:
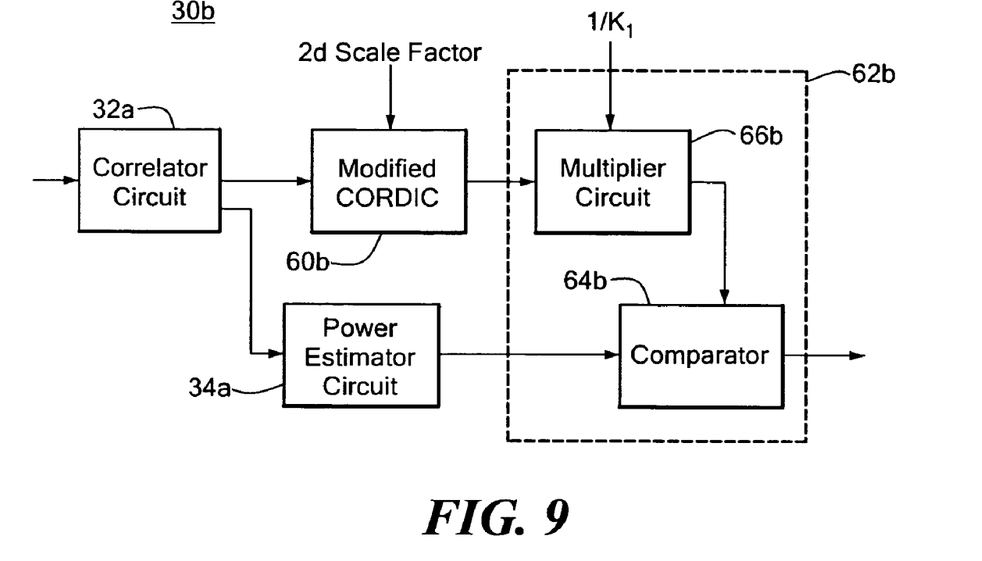
FIGS. 9 and 10 are schematic block diagrams of a packet detection system according to this invention in which the average correlation is scaled by the second scale factor.
Figure 10:
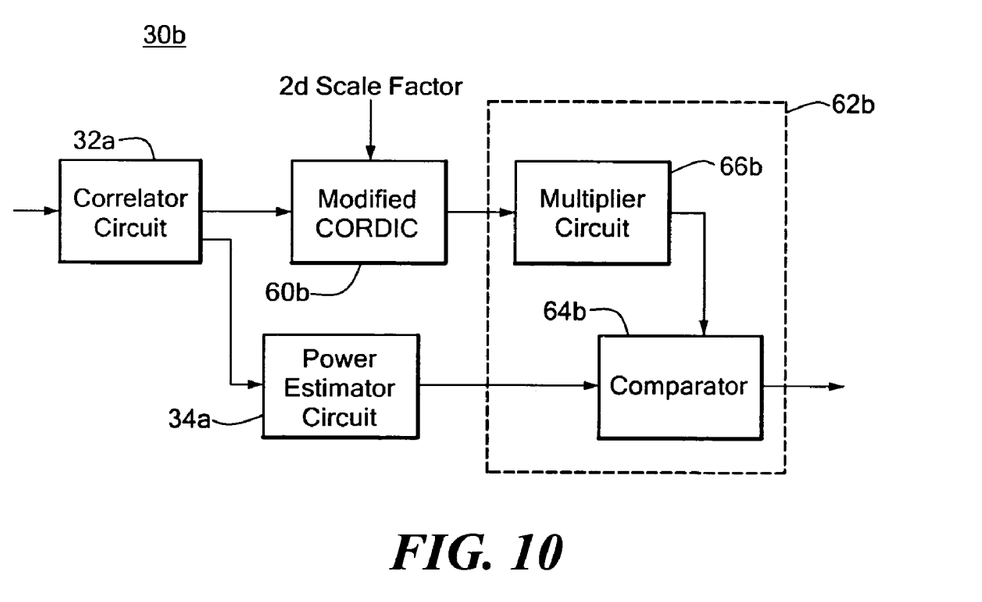

It is also understood, according to this invention, that the modified CORDIC unit may drive a multiplier circuit for multiplying the scaled magnitude of the average correlation signal by a second scale factor, $1/K_1$, to obtain another scaled value of the average correlation signal. Such a system 30b, FIG. 9, provides the second scale factor at the output of the modified CORDIC 60b and employs a multiplier circuit 66b to introduce the scale factor. Here, too, the multiplier 66b can be implemented with a shift and add circuit 66c, FIG. 10, which inherently multiplies by approximately $1/K_1$ known as a priori the output of the modified CORDIC 60b.

Figure 11:
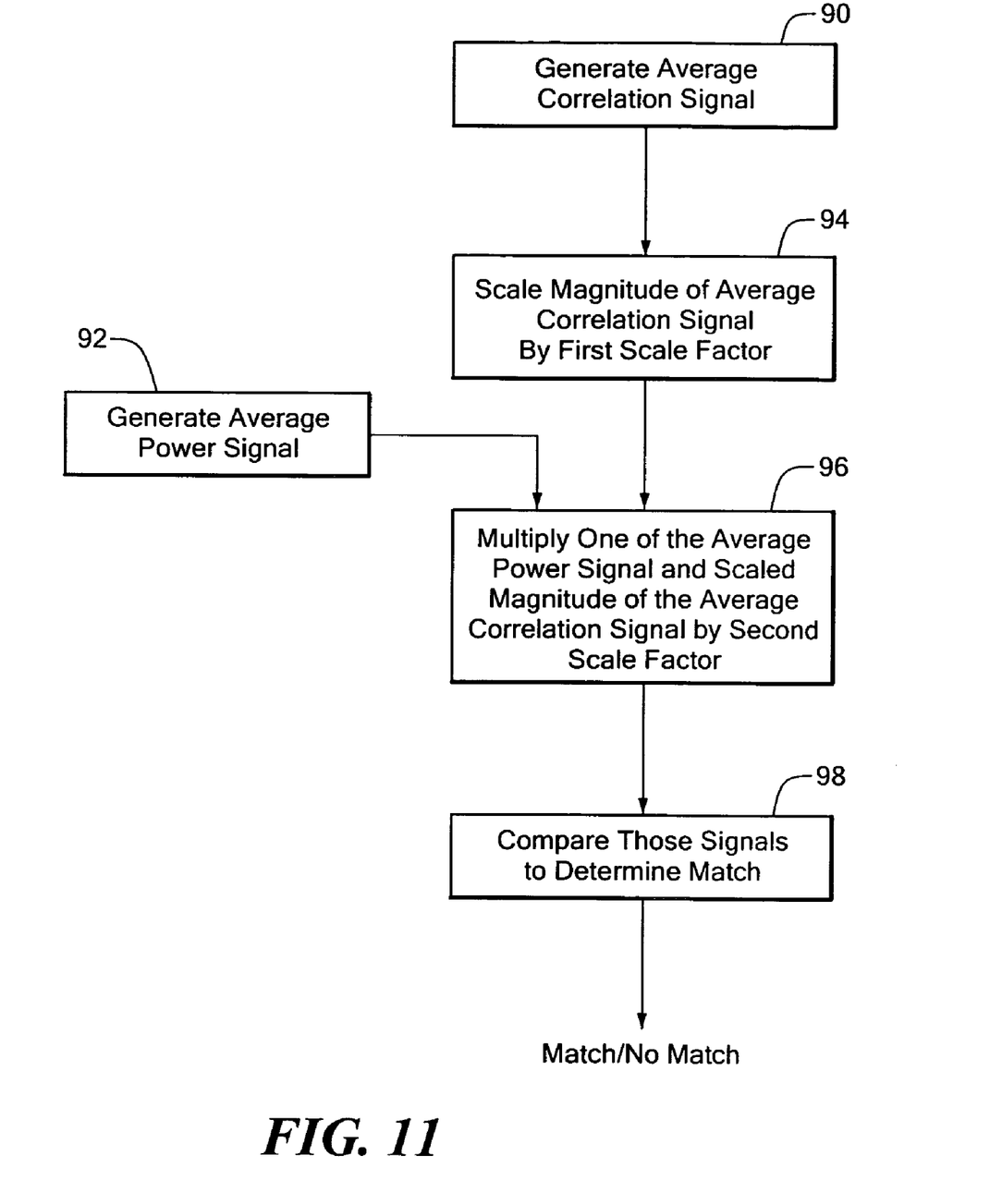
FIG. 11 is a flow chart of the method according to this invention.

In addition to the block diagrams shown in FIGS. 2 to 10, this invention also contemplates the method of packet detection that includes generating the average correlation signal, step 90, FIG. 11, between repetitive sequences of symbols and generating the average power signal, step 92, representative of the average power in the sequence of symbols. The average correlation signal is scaled, step 94, by a first scale factor. Next, one of the average power signal and scaled magnitude of the average correlation signal are multiplied, step 96, by a second scale factor and the two signals are then compared after the second scale factor has been applied to determine whether or not there has been a match between a repetitive sequence of symbols. A match is indicated in the comparator when the output of it is non-negative, that is, a number that is zero or greater than zero.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A packet detection system comprising:
   a correlator circuit for generating an average correlation signal representative of the match between repetitive sequences of symbols;
   a power estimator circuit for generating an average power signal representative of the average power in the sequence of symbols;
   a modified CORDIC circuit responsive to said average correlation signal for producing the scaled magnitude of the average correlation signal, scaled by a first predetermined scale factor; and
   a scaling comparator system for multiplying one of said average power signal and said scaled magnitude of the average correlation signal by a second scale factor and comparing the said signals to determine whether there is a match between a repetitive sequence of symbols.

2. The packet detection system of claim 1 in which said scaling comparator system includes a multiplier circuit for multiplying the average power signal by said second scale factor to obtain a scaled function of the average power; and a comparator circuit responsive to the scaled function of the average power and the scaled magnitude of the average correlation signal to determine whether there is a match between a repetitive sequence of symbols.

3. The packet detection system of claim 2 in which said average power unit drives the multiplier circuit for multiplying the average power signal by said second scale factor to obtain the scaled function of the average power.

4. The packet detection system of claim 2 in which said multiplier circuit includes a shift and add circuit.

5. The packet detection system of claim 2 in which said correlator circuit includes a delay circuit responsive to said sequence of symbols, a conjugating circuit responsive to the delayed sequence of symbols, a multiplier circuit responsive to the sequence of symbols and the delayed conjugated sequence of symbols from the conjugator circuit to produce an instantaneous value of the correlation and a moving average circuit responsive to the instantaneous value of the correlation to produce the average correlation signal.

6. The packet detection system of claim 2 in which said power estimator circuit includes a magnitude squarer circuit for providing a signal representative of the instantaneous power in the sequence of symbols and a moving average circuit responsive to said signal representative of the instantaneous power to produce said average power signal.

7. A packet detection method comprising:
   generating an average correlation signal representative of the match between a repetitive sequence of symbols;
   generating an average power signal representative of the average power in the sequence of symbols;
   producing a scaled magnitude of the average correlation signal scaled by a first predetermined scale factor; and
   multiplying one of the average power signal and scaled magnitude of the average correlation signal by a second scale factor and comparing those signals to determine whether there is a match between a repetitive sequence of symbols.

8. The packet detection method of claim 7 in which the scaled average correlation signal is multiplied by the second scale factor to obtain a second scaled function of the average correlation; and the average power signal and the scaled function of the average correlation are compared to determine whether there is a match between a repetitive sequence of symbols.

9. The packet detection method of claim 8 in which the scaled average correlation signal is multiplied by the second scale factor to obtain a second scaled function of the average correlation.

10. The packet detection method of claim 8 in which the multiplication includes shifting and adding.

* * * * *